June 24, 1958     C. W. TRITT     2,839,988
FILTER HEAD FOR COFFEE MAKERS
Original Filed May 31, 1955     2 Sheets-Sheet 1
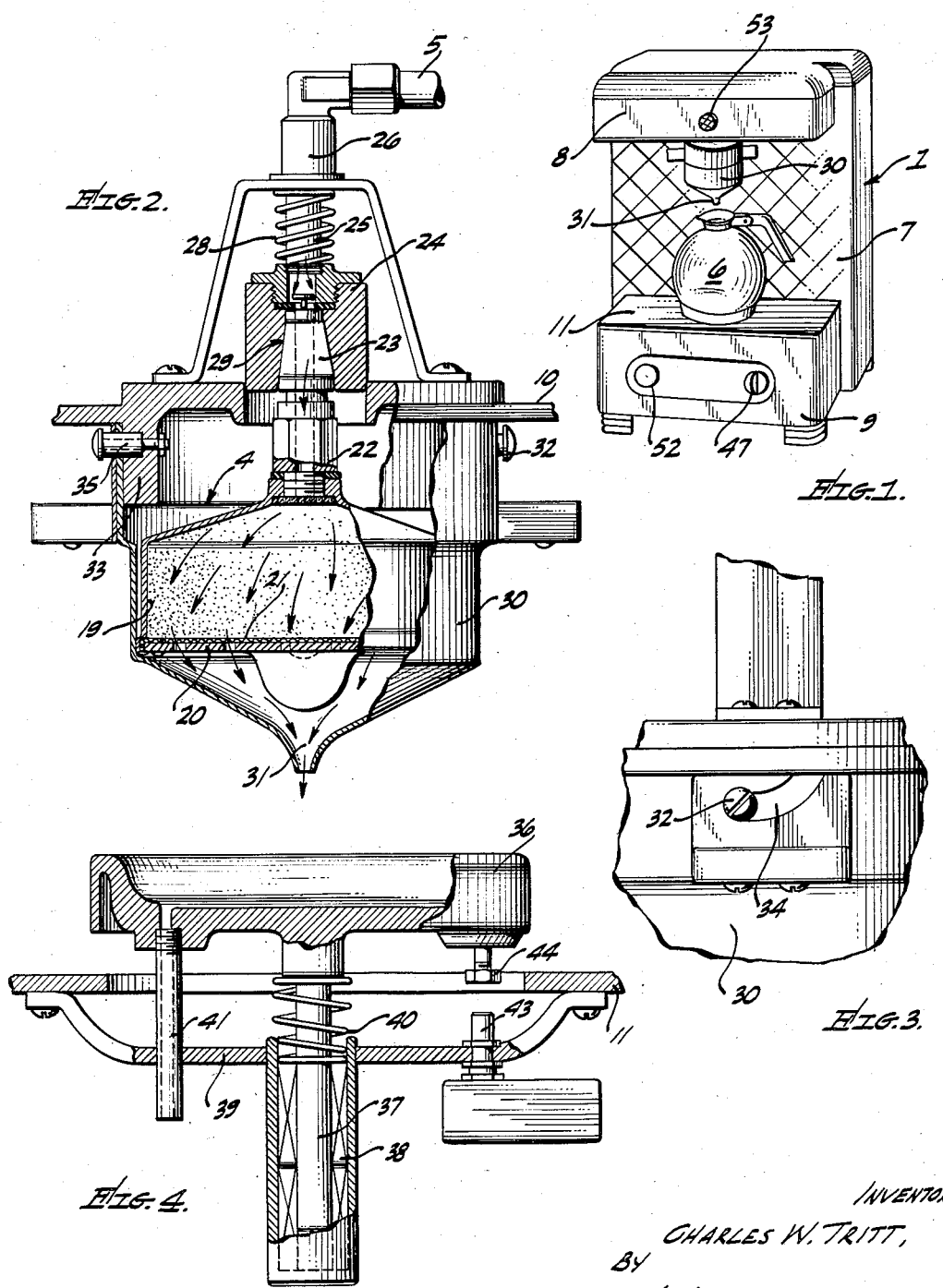
INVENTOR.
CHARLES W. TRITT,
BY
ATTORNEY June 24, 1958     C. W. TRITT     2,839,988
FILTER HEAD FOR COFFEE MAKERS
Original Filed May 31, 1955     2 Sheets-Sheet 2
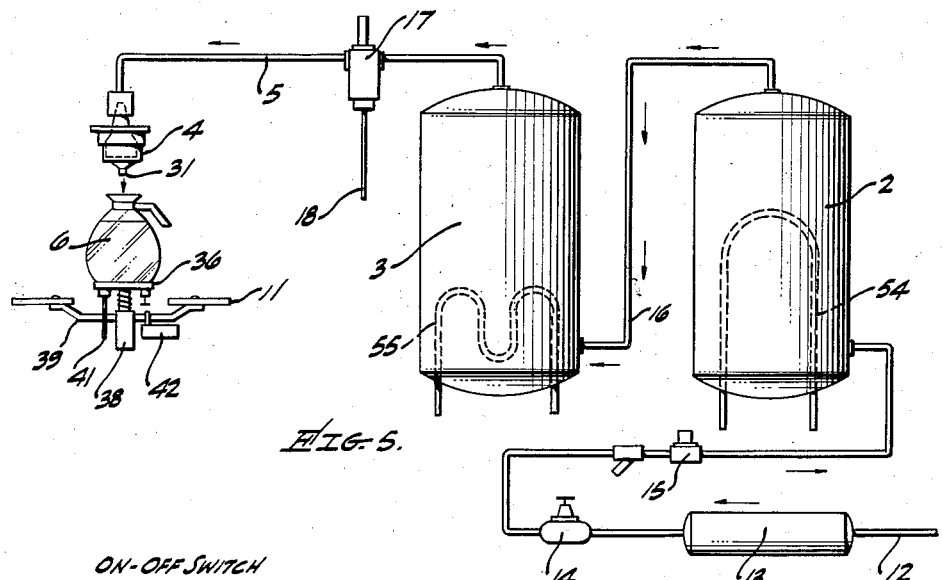
Fig-5.
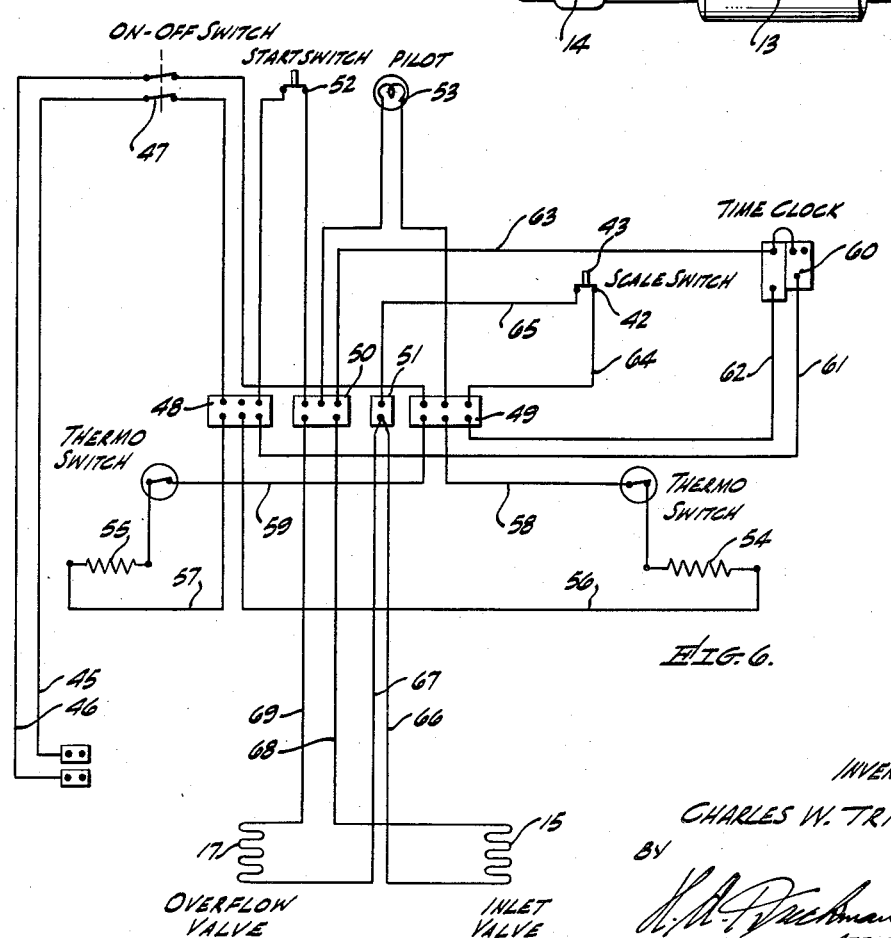
Fig-6.
INVENTOR.
CHARLES W. TRITT,
BY
ATTORNEY.

United States Patent Office 2,839,988
Patented June 24, 1958

2,839,988

FILTER HEAD FOR COFFEE MAKERS

Charles W. Tritt, Long Beach, Calif.

Original application May 31, 1955, Serial No. 511,967. Divided and this application September 4, 1956, Serial No. 607,759

4 Claims. (Cl. 99—307)

This invention is a division of my co-pending application, Serial No. 511,967, filed May 31, 1955, for an Automatic Coffee Maker.

This invention relates to beverage brewers, and with particular reference to brewers of the type used in restaurants and other commercial establishments for preparing large or repeated quantities of a beverage, such as coffee.

In beverage brewers in the type generally described above, it is important that the equipment have capacity for producing coffee or other beverages of uniform quality; further, that the brewing operation proceed as rapidly as permitted by the nature of the ingredients used, and that the apparatus itself be so designed that the operation of replacing one batch of coffee with another may be expedited to avoid unnecessary delay. One of the principal objects of this invention is, therefore, to provide a novel automatic coffee maker which meets these requirements.

Another object of my invention is to provide an automatic coffee maker which has an improved cartridge of simple and relatively inexpensive construction, and which is adapted to be easily and quickly removed from and replaced in the apparatus.

A feature of my invention resides in the construction of an automatic coffee maker which requires the minimum amount of labor to clean and maintain.

Still another object of my invention is to provide a novel automatic coffee maker, including a cartridge which will allow the water to flow through the coffee grounds and filter and be able to drain dry so that the cup of coffee grounds, or the like, is not wet, nor are the grounds difficult to handle.

Still another object is to provide a novel automatic coffee maker in which the cartridges are interchangeable in a single cartridge holder, while a good many cartridges can be filled in advance ready for use.

Other objects, advantages and features of invention may appear from the accompanying drawings, the subjoined detailed description and the appended claims.

In the drawings:

Figure 1 is a perspective view of an automatic coffee maker embodying my invention.

Figure 2 is a side elevation of my cartridge holder and cartridge with parts broken away to show interior construction.

Figure 3 is a fragmentary side elevation of the supporting means for the cartridge holder.

Figure 4 is a side elevation of the decanter weighing device with parts broken away to show interior construction.

Figure 5 is a diagrammatic view showing the flow of fluid through the coffee maker.

Figure 6 is a wire ring diagram illustrating the electric circuit of the coffee maker.

Referring more particularly to the drawings, this invention consists briefly of a housing 1 in which there is mounted two water reservoirs 2 and 3 which have means for heating water contained therein; this heating means being electrical, as will be subsequently described. The water is delivered from the reservoir 3 to the cartridge generally indicated at 4 through a pipe 5, which extends from the reservoir 3 to the cartridge in a manner which will be subsequently described. The coffee is brewed in the cartridge 4 and is delivered into a decanter or container 6.

Referring particularly to Figure 1, the housing 1 consists essentially of an inclosure 7, substantially rectangular in shape and having a hood 8 at the upper end thereof, and a platform 9 at the lower end thereof. the hood 8 includes a lower wall 10 and the platform 9 has an upper wall 11. The reservoirs 2 and 3 are mounted within the rectangular housing 7 and are suitably supported in the usual and well known manner. The water supply to the reservoirs 2 and 3 is through a water pipe 12, thence through a strainer 13 through a pressure regulator 14 and an inlet valve 15, and thence into the first or preheating tank 2. The water, after being preheated in the tank or reservoir 2, passes through the pipe 16 and thence into the final heating reservoir 3. A 3-way valve 17 is mounted in the pipe 5 and has a drain pipe 18 extending to the sewer when the machine is not brewing coffee, thereby acting as a safety valve and allowing no water to pass into the line leading to the cartridge 4 except when the device is brewing coffee. When the electrical system of the machine is actuated, as will be subsequently described, the inlet valve 15 opens and the overflow valve 17 changes position, allowing hot water to run into the line extending to the cartridge 4.

The purpose of having two water reservoirs or tanks is that the first one (2) is a preheating tank, and the second (3) is a high temperature tank. By this method I am able to discharge hot water at a high temperature at a rate adequate to supply a commercial quantity of coffee (approximately one gallon every four minutes). I utilize the usual 110 volt circuit with 1450 watt electrical heating system and thus it is possible to utilize my coffee maker on the standard housing wiring system and does not require special heavy wiring.

The cartridge 4 consists of an inverted cup shaped body 19 and with a perforated bottom or strainer 20. A sheet of filter material 21 is placed on the strainer 20 and the coffee is contained in the cup 19 above the filter 21. A nipple or fitting 22 extends through the center of the cup 19 and hot water flows through this nipple and into the cup and through the coffee grounds therein, as will be further described. The nipple 22 includes a tapered coupling element 23 which fits into a block 24 which is yieldably mounted in the hood 8 and on the bottom wall 10 thereof, as follows:

A pipe 25 is attached to the top of the block 24 and projects into an elbow 26 at the end of the pipe 5. The elbow 26 is mounted on a bracket 27 which is mounted on the bottom wall 10 of the hood 8. A spring 28 bears against the block 24 and presses this block downwardly against the coupling element 23. The block 24 is provided with a tapered seat 29 therein upon which the coupling element 23 rests. Thus the block 24 is spring pressed onto the coupling element 23 with a water-tight connection, so that the water will flow from the pipe 5 through the elbow 26, thence through the pipe 25 and into the coupling 23, the nipple 22, and thence into the cartridge 4. The bottom perforated strainer 20 of the cartridge 4 is held in position by a press fit so that the strainer can be removed in order to replenish the coffee within the cartridge. A cartridge holder 30 is formed with a bottom spout 31 through which the brewed coffee, or the like, flows into the decanter 6. The holder 30 is detachably mounted on the bottom wall 10 of the hood 8 in the following manner:

Two or more pins 32 are mounted in a ring 33 which depends from the bottom wall 10 of the hood 8. The holder 30 is formed with bayonet slots 34 therein to receive the slots 32. It will thus be evident that the holder 30 can be easily removed whenever it is necessary to replaced a cartridge 3 therein. My machine only requires one holder 30, whereas a number of cartridges 4 can be provided and maintained in a filled condition so that it again can be quickly inserted in the holder 30, as required. The pins 32 may each have a hardened sleeve 35 mounted thereon to prevent excessive wear.

The decanter 6 is mounted on a receptacle 36. The receptacle 36 is preferably shaped like a dish so that any water spilled therein will be retained. The receptacle 36 has a post 37 depending therefrom, and this post is mounted in a sleeve bearing 38 which is mounted on a strap 39 attached to the bottom of the wall 11. A spring 40 bears against the bottom of the receptacle 36 and tends to urge the receptacle upwardly. A drain pipe 41 extends downwardly from the receptacle 36 and is open to the hollow or dish portion of the receptacle so that water can be drained through this pipe. The pipe 41 extends through the strap 39, thus acting as an additional guide and positioning element for the receptacle 36. A precision switch 42, commonly termed a "microswitch," is mounted on the strap 39 and the actuating plunger 43 of the switch extends through the strap 39 and is engaged by the set screw 44 which projects downwardly from the receptacle 36.

When the proper amount of coffee has been delivered into the decanter 6 the additional weight of this coffee will compress the spring 40 until the set screw 44 engages the plunger 43 to actuate the precision switch 42.

The electrical circuit of my coffee maker, as shown in Figure 6, consists of the main incoming wires 45 and 46, and these wires extend to the main on-off switch 47. The lead 45 extends to a bus bar 48 and the lead 46 extends to a bus bar 49. Two additional bus bars 50 and 51 are provided and these bus bars are all separated or insulated one from the other. A starter switch 52 is connected to the buses 48 and 50, as shown. A pilot light 53 is connected to the buses 50 and 49 as shown, thus when the main switch 47 is closed and subsequently the starter switch 52 is closed the pilot light 53 will go on and the electrical system will start to function as follows:

A heating coil 54 is mounted in the reservoir 2 for the purpose of heating the water therein. Similarly, a heating coil 55 is mounted in the reservoir 3. The heating coils 54 and 55 are both electrically connected to the buses 48 and 49 through the leads 56, 57, 58 and 59. Since the main lead in wires 45 and 46 extend to the buses 48 and 49, it will be evident that current will flow through the coils 54 and 55 whenever the switch 47 is closed. A time clock 60 is connected to the buses 48 and 49 through the leads 61 and 62. The time clock 60 opens and closes the circuit to the buses 48 and 49 in the usual and well known manner. The time clock also has a starter lead 63 extending to the bus 50 and whenever the starter switch 52 is closed the time clock 60 will start and the starter switch is only held in a closed position long enough to start the time clock 60, and thereafter this clock will complete its cycle and the starter switch 52 is released and thus moves to an open position. In other words, the starter switch 52 merely starts the time clock 60 and thereafter its function is completed. The precision switch 42 has one lead 64 extending to the bus 49 and a second lead 65 extending to the bus 51. The solenoid inlet valve 15 and the solenoid overflow valve 17 are both connected through the leads 66 and 67, respectively, to the bus 51. These same solenoid valves are connected to the bus 50 through the leads 68 and 69, respectively. The precision switch 42 is in a closed position when the coffee maker first starts its cycle, and consequently, when the starter switch is closed manually, current will be fed to the solenoids of the inlet valve 15 to open this valve, and also to the valve 17 to position this latter valve so that water flows through the pipe 5 to the cartridge 4.

In operation the main switch 47 is first closed. This excites the bus bars 48 and 49. The starter switch 52 is now manually closed and held closed for about 5 or 10 seconds. While the starter switch is closed the time clock switch 60 is started and commences its cycle whereby the electrical circuit is held closed for approximately four minutes, more or less. The electrical heating coils 54 and 55 are both energized and water is heated in both the reservoirs 2 and 3. The purpose of having two water tanks is that the first one (2) is a preheating tank, and the second one (3) is a high temperature tank. Water flows into the tanks through the incoming water line 12 and the connecting pipe 16. The solenoid valve 17 has been actuated so that hot water now flows through the pipe 5 into the cartridge 4. The hot water flows over the coffee grounds in the cartridge and out through the screen 20, thence through the spout 31 and into the decanter 6. When the proper amount of coffee has flowed into the decanter 6 and the weight of this coffee will depress the receptacle 36 against the tension of the spring 40. Lowering of the receptacle 36 will open the prevision valve 42. As soon as the time switch 60 has reached its automatic opening position the electrical circuit is broken and the heating elements 54 and 55 are no longer excited. At the same time the solenoid switch 17 moves to the position where water drains through the pipe 18 into the sewer and, consequently, water does not flow to the cartridge unit 4.

Having described my invention, I claim:

1. A cartridge for a beverage brewer including a housing, comprising the combination of an inverted cup shaped body open at the lower end thereof, a perforated strainer removably mounted on the lower end of said body, a holder enclosing said body and supporting the same, a spout on the lower end of said holder, means releasably mounting the holder on said housing, a tubular fitting on the upper end of said body and opening into the body, a block, means mounting the block in the housing, and means on the block releasably receiving said fitting with a sliding fit, a liquid conduit extending to said fitting to conduct liquid through the fitting and into said body.

2. A cartridge for a beverage brewer including a housing, comprising the combination of an inverted cup shaped body open at the lower end thereof, a perforated strainer removably mounted on the lower end of said body, a holder enclosing said body and supporting the same, a spout on the lower end of said holder, means releasably mounting the holder on said housing, a tubular fitting on the upper end of said body and opening into the body, a block, means on the block releasably receiving said fitting, means mounting said block for vertical movement, and spring means bearing against said block and urging said block downwardly against said fitting with a sliding fit, a liquid conduit extending to said fitting to conduct liquid through the fitting and into said body.

3. In a cartridge for a beverage brewer including a housing, comprising the combination of an inverted cup shaped body open at the lower end thereof, a perforated strainer, means removably mounting said strainer on the lower end of said body, a holder enclosing said body and supporting the same, a spout at the lower end of said holder through which liquid passes, means releasably mounting the holder on said housing, a tubular fitting on the upper end of said body and opening into the body, a block, means mounting the block in the housing, said block having a bore therein releasably receiving said fitting with a sliding fit, an elbow, a liquid conduit connected to the elbow, a pipe rising from the block and extending into said elbow, said pipe fitting in the elbow with a sliding fit whereby liquid is fed through the fitting and into said body.

4. In a cartridge for a beverage brewer including a housing, comprising the combination of an inverted cup shaped body open at the lower end thereof, a perforated strainer, means removably mounting said strainer on the lower end of said body, a holder enclosing said body and supporting the same, a spout at the lower end of said holder through which liquid passes, means releasably mounting the holder on said housing, a tubular fitting on the upper end of said body and opening into the body, a block, means mounting said block in the housing for vertical movement therein, springs means bearing against said block and urging said block downwardly against said fitting, said block having a bore therein releasably receiving said fitting with a sliding fit, an elbow, a liquid conduit connected to the elbow, a pipe rising from the block and extending into said elbow, said pipe fitting in the elbow with a sliding fit whereby liquid is fed through the fitting and into said body.

References Cited in the file of this patent

UNITED STATES PATENTS

| | | |
|---|---|---|
| Re. 22,879 | Peters et al. | May 13, 1947 |
| 912,634 | Warburton | Feb. 16, 1909 |
| 992,021 | Marzetti | May 9, 1911 |
| 2,013,172 | Petrone | Sept. 3, 1935 |
| 2,205,290 | Herrera | June 18, 1940 |
| 2,558,521 | Karlen | June 26, 1951 |
| 2,615,385 | Smail | Oct. 28, 1952 |
| 2,783,704 | Liebelt | Mar. 5, 1957 |

FOREIGN PATENTS

| | | |
|---|---|---|
| 440,681 | Germany | Feb. 11, 1927 |